United States Patent
Gupta (10) Patent No.: US 6,212,565 B1
(45) Date of Patent: Apr. 3, 2001

(54) APPARATUS AND METHOD FOR IMPROVING PERFORMANCE OF PROXY SERVER ARRAYS THAT USE PERSISTENT CONNECTIONS

(75) Inventor: Amit Gupta, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/140,094

(22) Filed: Aug. 26, 1998

(51) Int. Cl.⁷ ..................................................... G06F 15/16

(52) U.S. Cl. ........................... 709/229; 709/219; 709/203

(58) Field of Search ................................. 709/229, 219, 709/203

(56) References Cited

U.S. PATENT DOCUMENTS

| | | |
|---|---|---|
| 5,452,294 | 9/1995 | Natarajan . |
| 5,708,780 * | 1/1998 | Levergood et al. .................. 709/229 |
| 5,740,370 | 4/1998 | Battersby et al. . |
| 5,740,430 | 4/1998 | Rosenberg et al. . |
| 5,742,762 * | 4/1998 | Scholl et al. ........................ 709/200 |
| 5,812,769 * | 9/1998 | Graber et al. ....................... 709/228 |
| 5,835,718 * | 11/1998 | Blewett ............................... 709/218 |
| 5,991,810 * | 11/1999 | Shapiro et al. ...................... 709/229 |
| 6,041,324 * | 3/2000 | Earl et al. ............................. 707/9 |
| 6,049,821 * | 4/2000 | Theriault et al. .................... 709/203 |
| 6,085,242 * | 7/2000 | Chandra ............................... 709/223 |
| 6,138,162 * | 10/2000 | Pistriotto et al. .................... 709/229 |

FOREIGN PATENT DOCUMENTS

| | | |
|---|---|---|
| 0380239 | 1/1990 | (EP) . |
| WO 9822886 | 5/1998 | (WO) . |

OTHER PUBLICATIONS

Web Page: "Cache Array Routing Protocol (CARP) Whitepaper", Microsoft Proxy Server, Technical Papers, Printed: Jun. 12,1998, pp.: 1–11, URL:http://www.asia.microsoft.com/proxy/guide/CarpWP.asp.

Web Page: "Cache Array Routing Protocol (CARP) v1.0 Specifications", Microsoft Proxy Server, Technical Papers, Printed: Jun. 12, 1998, pp.: 1–6, URL:http://www.asia.microsoft.com/proxy/guide/CarpSpec.asp?A=2&B=3.

Article: "Shared Network Caching and Cisco's Cache Engine", 1998 Cisco Systems, Inc. Important Notices, Posted: Apr. 29, 1998, pp.: 1–10.

(List continued on next page.)

*Primary Examiner*—Krisna Lim
(74) *Attorney, Agent, or Firm*—Squire, Sanders & Dempsey L.L.P.

(57) ABSTRACT

A method and apparatus that ensures that requests for pages in a particular domain name are routed to the same proxy server by all of a plurality of clients. If, for example, a proxy server has a persistent connection to a server for a domain, all incoming requests for that domain will be sent to the proxy server and will, thus, be able to take advantage of the persistent connection. Each client contains a proxy table that is periodically updated by one or more of the proxy servers. A proxy table in a client contains an entry corresponding to each proxy server. When a client needs to access a resource through a proxy server, the client truncates the address (e.g., the URL) of the resource. Thus, for example, all addresses in a particular domain name are truncated to the same value. The truncated address is then used to hash into the proxy table in the client and to identify a proxy server. The client sends its request to the identified proxy server. Thus, all requests for a particular domain hash to the same proxy table entry and, hence, to the same proxy server. If the proxy server has opened a persistent connection to the server for the requested domain, the proxy server will be able to take advantage of the persistent connection.

29 Claims, 9 Drawing Sheets

OTHER PUBLICATIONS

Internet Draft: "Cache Array Routing Protocol v1.0", Author(s): Vinod Valloppillil, Microsoft Corporation and Keith W. Ross, University of Pennsyvania, Dated: Feb. 26, 1998, pp.: 1–7 URL://http:www.<draft–vinod–carp–v1–03.txt>.

Article: "Application of Internet Cache Protocol (ICP), Version 2", Network Working Group, Request for Comments: 2187, Category: Informational, Author(s): D. Wessels and K. Claffy of the National Laboratory for Applied Network Research/UCSD, Dated: Sep. 1997, pp.:1–25.

Article: "Internet Cache Protocol (ICP), Version 2", Network Working Group, Request for Comments: 2186, Category: Informational, Author(s): D. Wessels and K. Claffy of the National Laboratory for Applied Network Research/UCSD, Dated Sep. 1997, pp.:1–10.

Web Page: "The Inktomi Technology Behind HotBot", A White Paper, Inktomi Corporation—Coupled Cluster Computing, Category: Inktomi Products, Copyright 1996, Printed: Jun. 8, 1998, pp.: 1–6 URL:http://www.inktomi.com/products/search/clustered.html.

Web Page: "Deploying Transparent Caching With Inktomi's Traffic Server", Inktomi Corporation Deploying Transpatent C . . . , Category: Inktomi Products, Printed: Jun. 8, 1998, pp.: 1–3 URL:http://www.inktomi.com/products/traffic/tech/deploy.html.

Web Page: "System for opening cache file associated with designated file of the file server only if the file is not subject to being modified by different program," http://www.patents.ibm.com/claims?patent_number=5740370, pp. 1–4.

Z. Fei et al.: "A Novel Server Selection Technique for Improving the Response Time of a Replicated Service," 1998 IEEE, pp.: 783–791.

G. D.H. Hunt et al.: "Network Dispatcher: a connection router for scalable Internet services," Computer Networks and ISDN Systems, 1998, pp.: 347–357.

Netscape Support Documentation: "Proxy Client Auto–Config File Format," Mar. 1996, pp. 1–12, URL:http://home.netscape.com/eng/mozilla/2.0/relnotes/demo/proxy-live.html.

* cited by examiner

FIG. 1
A TYPICAL CLIENT/SERVER NETWORK

FIG. 3

FIG. 4
PERFORMED BY PROXY SERVER
TO UPDATE PROXY SERVER TABLE

FIG. 7(c)
ANOTHER PROXY TABLE HEADER

FIG. 5

FIG. 7(a)
EXAMPLE PROXY TABLE
(CREATED IN PROXY SERVER; SENT FROM PROXY SERVER TO CLIENT; USED BY CLIENT TO DETERMINE TO WHICH PROXY SERVER TO SEND A REQUEST FOR A PAGE)

FIG. 7(b)

EXAMPLE PROXY TABLE
(CREATED IN PROXY SERVER; SENT FROM
PROXY SERVER TO CLIENT; USED BY

FIG. 8

APPARATUS AND METHOD FOR IMPROVING PERFORMANCE OF PROXY SERVER ARRAYS THAT USE PERSISTENT CONNECTIONS

BACKGROUND OF THE INVENTION

This invention relates generally to client-server computer networks. More particularly, this invention relates to a general technique for improving the performance of a proxy server array during persistent network access.

The recent publicity and emphasis on the information superhighway has increased the awareness and acceptance of the Internet as a mass communications medium. Until recently, "cruising or surfing" the Internet was a disorienting, even a frustrating experience, something like trying to navigate without maps. The World Wide Web has made it easier to access the array of resources available on the Internet. Resources, such as web servers, ftp servers, and telnet servers, provide the user with the ability to easily find the data content or information he wants simply and easily.

The volume of World Wide Web traffic on the Internet is staggering but a significant fraction of this traffic is redundant. That is, a large number of users request the same data from the same resource, at around the same time. As a result, a significant percentage of a corporation's network infrastructure is carrying and servicing the repeated requests for same data content, day after day.

To manage this growing demand for access to the Internet and to reduce network communications costs, several system-level applications have been developed to extend caching to the client/server network environment. Two current approaches are proxy server arrays and network caches. Proxy server arrays are network server-based applications that are placed between a client application, such as a web browser, and a resource, such as a Web server. Initially proxy servers were designed to deal with problems caused by firewall issues in corporate web access. Eventually, proxy servers were also recognized as being an ideal environment to cache web data and to improve system performance, as well as to reduce the load on the network and on the servers.

In most World Wide Web based client/server applications, the proxy server receives a request to access a specific resource from a client system. The proxy server examines the request to determine if it can service the request itself. If the particular web page is stored in its cache, the proxy server will retrieve the web page and forward it to client that made the request. If not, the proxy server sends a request to the desired resource site specified by the Uniform Resource Locator (URL). The URL acts as the address of the resource and as such is unique throughout the Internet. The proxy server retrieves the web page from the resource specified by the URL address and transfers the web page to the client. In addition, the proxy server stores the web page in its cache for future use by other client systems.

It is becoming common for networks (such as intranets or the Internet) to include a plurality of proxy servers accessible by one or more clients. Requests from clients for various pages stored on servers in the network are routed through the plurality of proxy servers, which cache pages whenever possible.

Certain systems allow the client to specify to which proxy server it will send its request. Thus, a certain client can send requests to more than one proxy server. While caching performed by these proxy servers improves the overall performance of a network, having more than one proxy server store the same web pages in its cache is inefficient.

The World Wide Web operates using the http protocol. An initial version of http (http 1.0) required a separate TCP connection for each transfer of information between a client and a proxy or a server. Subsequently, newer versions of the http protocol have reduced the need to establish a separate connection for each request. For example, version 1.1 of the http protocol includes "persistent http," where multiple http transfers can use the same connection, i.e., the same proxy server without having to establish a new connection each time. Persistent http connections are described in, for example, Request For Comments (RFC) 2068, "Hypertext Transfer Protocol—HTTP/1.1," January 1997, available from the Internet Engineering Taskforce (IETF).

A problem arises, however, if a client can send its requests to more than one proxy server, since clients generally do not know whether a proxy server has a persistent connection to the web server or not. Furthermore, if one or more clients can access one or more proxy servers, the clients do not know which of the proxy servers have already received requests for a particular service from another client (and may therefore have a persistent connection open).

In some conventional systems, the Internet Cache Protocol (ICP) is used to determine and select the most applicable location from which to retrieve a requested web page. In ICP, one proxy server establishes a "working" relationship with other proxy servers. Proxy servers designated as parents are on one level while child proxy servers are on lower level(s). The terms "neighbor" and "peer" refer to either a parent or a sibling which are a single "cache reference" away.

In general, in ICP the flow of a client request is up through the hierarchy of proxy servers. If a proxy server does not have a client's requested web page, it requests that a special proxy server, called an arbitrator, query the other proxy servers to see if they have the desired web page. If any of these proxy servers has the requested web page in its cache, then the inquiring proxy server enters a demand for the web page. The cached web page is either forwarded directly to the client or to the original proxy server for transfer to the client. If none of the proxy servers have the web page in their cache, the proxy server must forward the request either to a parent or back to the origin proxy server for service. Thus, if a successful request or "hit" occurs, it may fetch the web page from a peer proxy server or the requested wed page is received from a parent but if the request is unsuccessful or "missed," it must be passed to a parent server for service. The role of a parent is complete the transaction and service the request. If necessary, a parent proxy server will open a resource directly to service a client's request.

There are several problems that arise with the ICP approach. For example, the arbitrating proxy server may be overrun with requests or the network path between proxy servers may be congested. In addition, the additional hierarchy introduces extra delays for the clients requesting uncached data.

Other conventional client/server systems, such as the CARP (Cache Array Routing Protocol), available from Microsoft, Inc. of Redmond, Washington access a variety of proxy servers to retrieve pages stored on a single server. CARP, for example, uses a deterministic hashing function in the client to allocate page accessing and caching among a variety of proxy servers. By accessing a variety of proxy servers for various pages stored on a server, the CARP system aims to achieve load balancing between the proxy servers. Unfortunately, such a system has the disadvantage that it requires a hashing function that distributes the page accesses equally among the proxy servers. If the hashing function is poorly chosen or if the URL names lead to unbalanced distribution of the URLs to various proxies, it will negatively affect the load balancing between proxy servers. Thus, CARP's use of a deterministic hashing function to distribute requests to proxies does not always achieve a good distribution of requests among proxies. Lack of good distribution leads to inefficient usage of proxies. More importantly, with CARP, two URLs for the same Web server are likely to be sent to two different proxy servers, thereby undoing the benefits of persistent connections between a particular proxy and a server.

SUMMARY OF THE INVENTION

A described embodiment of the present invention provides a method and apparatus that ensures that requests for pages for a particular domain name are routed to the same proxy server by all of a plurality of clients. If, for example, a proxy server has a persistent connection to a server for a domain, all incoming requests for that domain will be sent to that proxy server and will, thus, will be able to take advantage of the persistent connection between the proxy server and the server hosting the Web site. The clients use a proxy table stored in the client to determine to which of a plurality of proxy servers they should send requests for particular pages.

Each client contains a proxy table that is periodically updated by one or more of the proxy servers. In the described embodiment, each proxy table in a client has an associated "time to live." When a proxy table's time to live has expired, the client obtains a new proxy table. In one embodiment, a proxy table in a client contains an entry corresponding to each proxy server. Each proxy table entry identifies the name of the corresponding proxy server, the network address of the proxy server (for example, the IP address), a port number of the proxy server, and a URL from which to get a new copy of the proxy table itself.

In a described embodiment, when a client needs to access a resource through a proxy server, the client truncates the address (e.g., the URL) of the resource. Thus, for example, all addresses in a particular domain name are truncated to the same value. The truncated address is then used to hash into the proxy table in the client and to identify a proxy server. The client sends its request to the identified proxy server. Thus, all requests for a particular domain hash to the same proxy table entry and, hence, to the same proxy server. If the proxy server has opened a persistent connection to the server for the requested domain, the proxy server will be able to take advantage of the persistent connection.

In accordance with the purpose of the invention, as embodied and broadly described herein, the invention relates to a method of accessing information in a client/server network, comprising the steps, performed by a client in the client/server network, of: receiving a proxy table having at least one entry for each of a plurality of proxy servers in the client/server network, the entry containing information about how to connect to a respective one of the proxy servers; receiving an address of a page to access, the page being stored on a server in the client/server network; truncating the address to remove from the address a portion of the address attributable to the page, yielding a truncated address identifying the domain of the page; hashing the truncated address to yield an index value,of the proxy table; and accessing a proxy server that is pointed to by the index value in the proxy table to retrieve the page.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, sever to explain the principles of the invention.

DETAILED DESCRIPTION OF EMBODIMENTS

The present invention now will be described more fully with reference to the accompanying drawings, in which the embodiments of the invention are shown. The present invention may, however, embodied in many different forms and should not be construed as limited to the embodiment set forth herein; rather these embodiments are provided so that this disclosure will be thorough and complete and will fully convey the invention to those skilled in the art.

Figure 1:
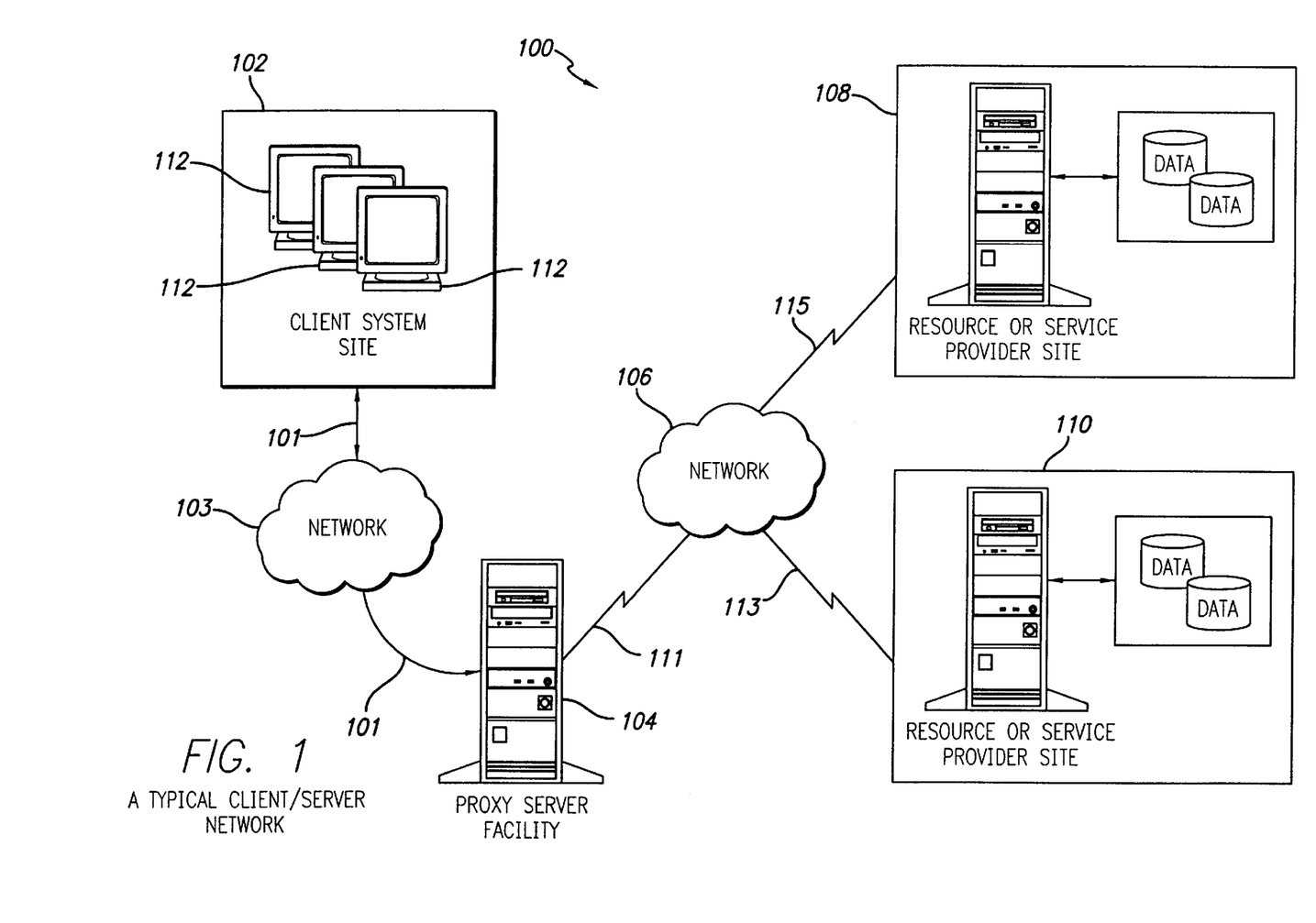
FIG. 1 shows an example of a typical client/server network on which an embodiment of the present invention can be implemented.

FIG. 1 is a block diagram illustrating a typical client/server computer network 100, in accordance with the present invention. Computer network 100 includes a client site 102 coupled via a network 103 and connections 101 to a proxy server facility 104 that is able to communicate with one or more resources 108, 110 via the another network 106. Typically, a client site includes several client systems 112 that interact with proxy servers 104, via an appropriate connection 101 such as a local area network, intranet, or internet link. The proxy servers 104 use a network interface or connection 111 to communicate with the network to at least one resource 108, 110.

Figure 2:
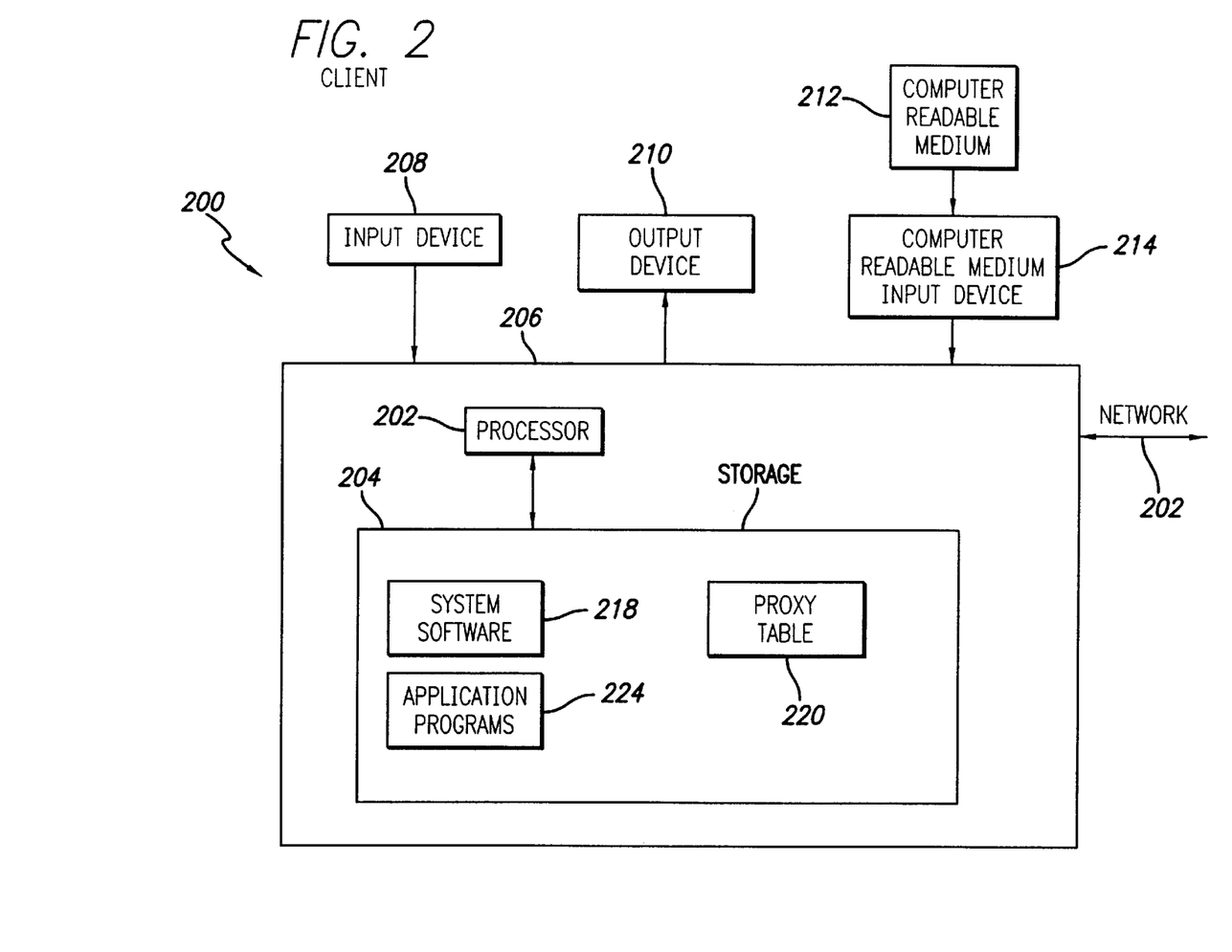
FIG. 2 shows a data processing system used to perform the functions of a described embodiment of the invention.

FIG. 2 shows a data processing system 200 that is programmed to perform the functions of a system such as the client systems 112. Proxy servers 104 can be similarly configured. The system 200 includes a processor 202 (or any appropriate processor or processors), and some form of storage 204. A portion of the storage 204 contains the software tools and data of the present invention. Storage 204 is capable of storing system software 218 and application programs 224 and a proxy table 220.

Storage 204 stores system software, computer programs, executable computer instructions, and other software, such as a web browser to communicate with resources 108, 110 via proxy servers 104.

A person of ordinary skill in the art will understand the client systems 112 may also contain additional system components, such as input/output devices; input devices, such as a keyboard, a mouse, and a voice input device; and display devices, such as a display terminal. One or more of these client systems 112 may also include an input device, such as a floppy disk drive, CD ROM reader, or DVD reader, that reads computer instructions stored on a computer readable medium, such as a floppy disk, a CD ROM, or a DVD drive. The client systems 112 also may include application programs, operating systems, data, etc., which are not shown in the figure for the sake of clarity. It also will be understood that these systems 114 can also include numerous elements not shown, such as disk drives, keyboards, display devices, network connections, additional memory, additional CPUs, LANs, input/output lines, etc.

In the following discussion, it is understood that the appropriate processors 202 (or similar processors) perform the steps of methods and flowcharts discussed preferably executing instructions in storage 204. It will also be understood that the invention is not limited to any particular implementation or programming technique and that the invention may be implemented using any appropriate techniques for implementing the functionality described herein. The invention is not limited to any particular programming language or operating system.

The instructions in storage 204 may be read into memory from a computer-readable medium 212. Execution of sequences of instructions contained in storage 204 causes the processor 202 to perform the process steps described herein. In alternative embodiments, hard-wired circuitry may be used in place of or in combination with software instructions to implement the invention. Thus, embodiments of the present invention are not limited to any specific combination of hardware circuitry and software.

The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio wave and infrared data communications. Common forms of computer-readable media include, a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read. The instructions can also be transmitted via a carrier wave in a network, such as a LAN, a WAN, or the Internet.

While the present invention will be described as a single client system, a single proxy server and a single resource environment, it will be appreciated by those skilled in the art the benefits and advantages of present invention is also applicable to a multiple client environment.

The following paragraphs describe an embodiment of the present invention, in which the clients determine which proxy server to access in order to request a page from a server. The described embodiment preferably causes all accesses by a plurality of clients to all pages in a particular domain to be made via the same proxy server. This single proxy server will, thus, maintain a persistent connection to the server.

Figure 3:
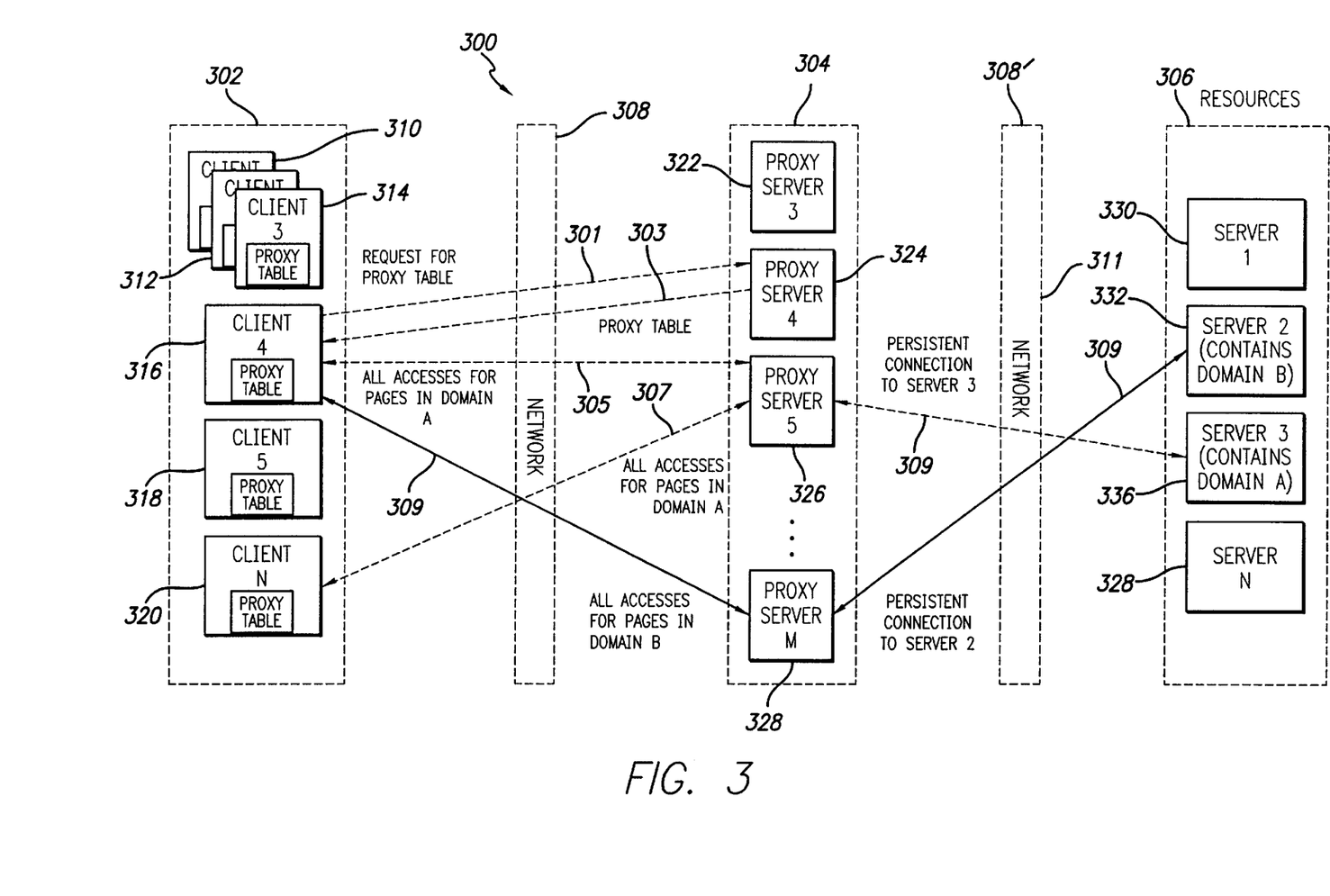
FIG. 3 is a block diagram showing a network in accordance with an embodiment of the present invention.

FIG. 3 is a block diagram showing a plurality of clients 302, a plurality of proxy servers 304, and a plurality of resources (servers) 306 as described above connected by a network 308, 308'. In the embodiment of FIG. 3, as described below in detail, each client periodically requests a proxy table from one of the plurality of proxy servers (step 301). A proxy server 304 receiving a request from a client 302 for a proxy table sends a copy of the current proxy table to the requesting client (step 303). The client thereafter uses the proxy table to determine which proxy server to access when the client needs to retrieve one of the various pages stored on the plurality of servers. The proxy servers update the proxy table as proxy servers are added and subtracted from the network or group of proxy servers.

In the described embodiment, all clients access all pages located in a single Web domain on a server via the same proxy server. This allows the system to take advantage of a persistent connection between the proxy server and the Web server. If a certain embodiment of the invention creates a to persistent connection, and uses it to advantage during the next access request from the client. As shown in FIG. 3, for example, all accesses to pages stored on server 3 336 will be made through proxy server 5 326. Proxy server 5 326 has a persistent connection to server 3 336. Thus, access 305 from client 4 316 is sent to proxy server 5 326 and access 307 from client N 320 is sent to proxy server 5 326. Proxy server 5 326 then retrieves the requested pages from server 3 336 (or from its cache if it has one and the page is cached).

Similarly, all accesses to pages stored on server 2 332 will be made through proxy server M 328. Proxy server M 328 has a persistent connection to server 2 332. Thus, access 309 5 from client 4 316 is sent to proxy server M 328. Proxy server M 328 then retrieves the requested pages from server 2 332 (or from its cache if it has one and the page is cached).

In alternate embodiments, all of the clients will access all pages of a particular domain stored on a particular server via a predetermined "group" of proxy servers. Thus, although the described embodiment uses a "single" proxy server for each domain, alternate embodiments can also use a group of proxy servers for each domain.

Figure 4:
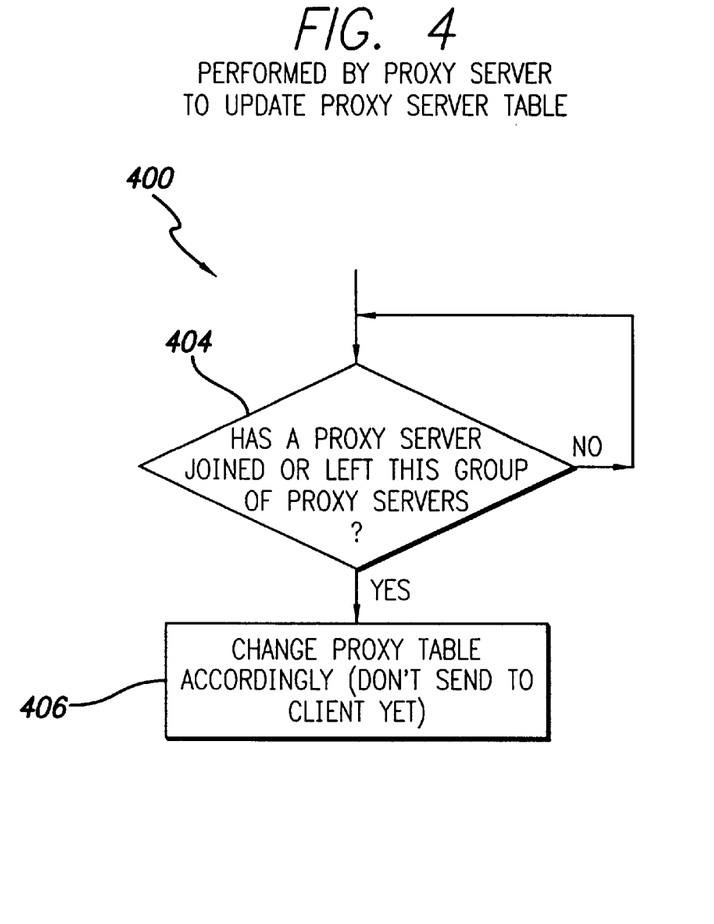
FIG. 4 is a flow chart showing steps performed by a proxy server to update a proxy table in accordance with the embodiment of FIG. 3.

In the described embodiment, the proxy servers cooperate to ensure that the current proxy table stored in the proxy servers reflects which proxy servers are currently available. FIG. 4 is a flow chart 400 showing steps performed by a proxy server to update a proxy table in accordance with the embodiment of FIG. 3. In the described embodiment, each of the proxy servers maintains and updates a proxy table, which is periodically sent to a requesting client. In other implementations of the present invention, a central proxy server maintains the proxy table.

In step 404 of FIG. 4, the proxy server determines whether any proxy servers have joined or left the group. This can be determined in a number of ways, such as by polling the other proxy servers or by receiving messages from the other proxy servers. If a proxy server has joined or left the plurality of proxy servers, in step 406, the proxy table is changed to reflect this addition or deletion.

Figure 7A:
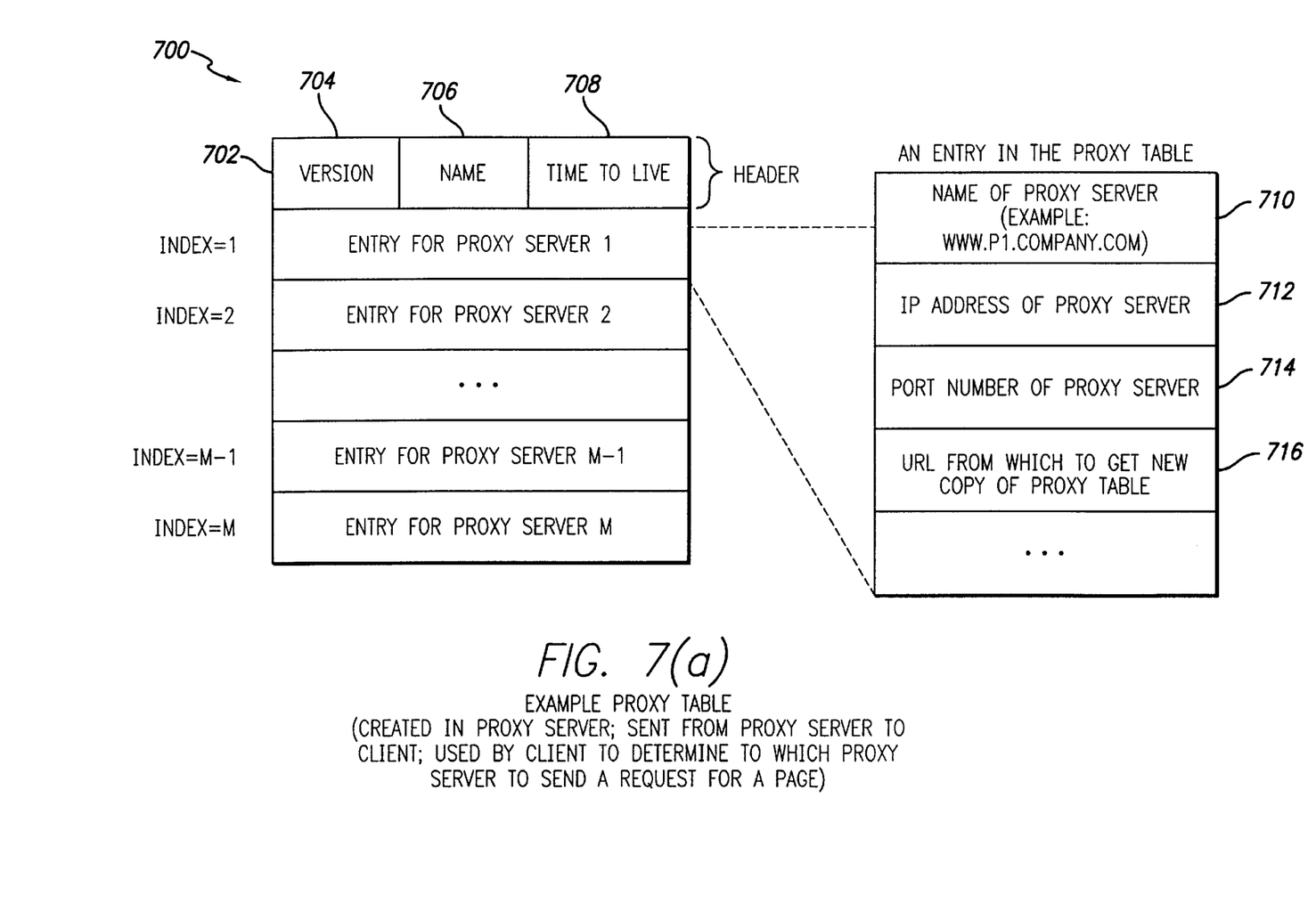
FIG. 7(a) shows an exemplary format of a proxy table, including a header format.

FIG. 7(*a*) shows an exemplary format 700 of a proxy table stored in a client. It will be understood that any appropriate format can be used and that the format of various implementations of the present invention may differ somewhat from the example shown. In general, a proxy table should include:

- a URL (or some other address) that a client can call to obtain an updated proxy table (in the example of FIG. 7(*a*), each entry in the proxy table contains such a value, although other embodiments may contain a single address for obtaining an updated proxy table);
- a "time to live" value for the proxy table, representing a length of time that the client should wait until requesting an updated proxy table;
- at least one entry in the proxy table for each proxy server, indicating how to access the proxy server (i.e., name of the proxy server, IP address and port number, etc.).

In FIG. 7(*a*), the proxy table format includes a header 702, which includes a version number 704, indicating the version number of the proxy table format; a name of the proxy table 706; and a time to live value 708 for the proxy table. The example format further includes a plurality of table entries. In the example of FIG. 7(*a*), the same number of proxy servers may appear in several entries of the proxy table. Each entry includes a name 710 of the proxy server (such as, for example of FIG. 8, www.p1.company.com), an IP address 712 of the proxy server, a port 714 of the proxy server, and a URL 716 at which to obtain an updated proxy table when the time to live 708 has expired. The use of various ones of these fields is described below in connection with FIGS. 5 and 6.

When the proxy table is updated in FIG. 4, entries are added or deleted in accordance with the proxy servers that have been added or deleted. Thus, the number of entries in the proxy table is related to the number of proxy servers in the plurality of proxy servers 304.

Figure 5:
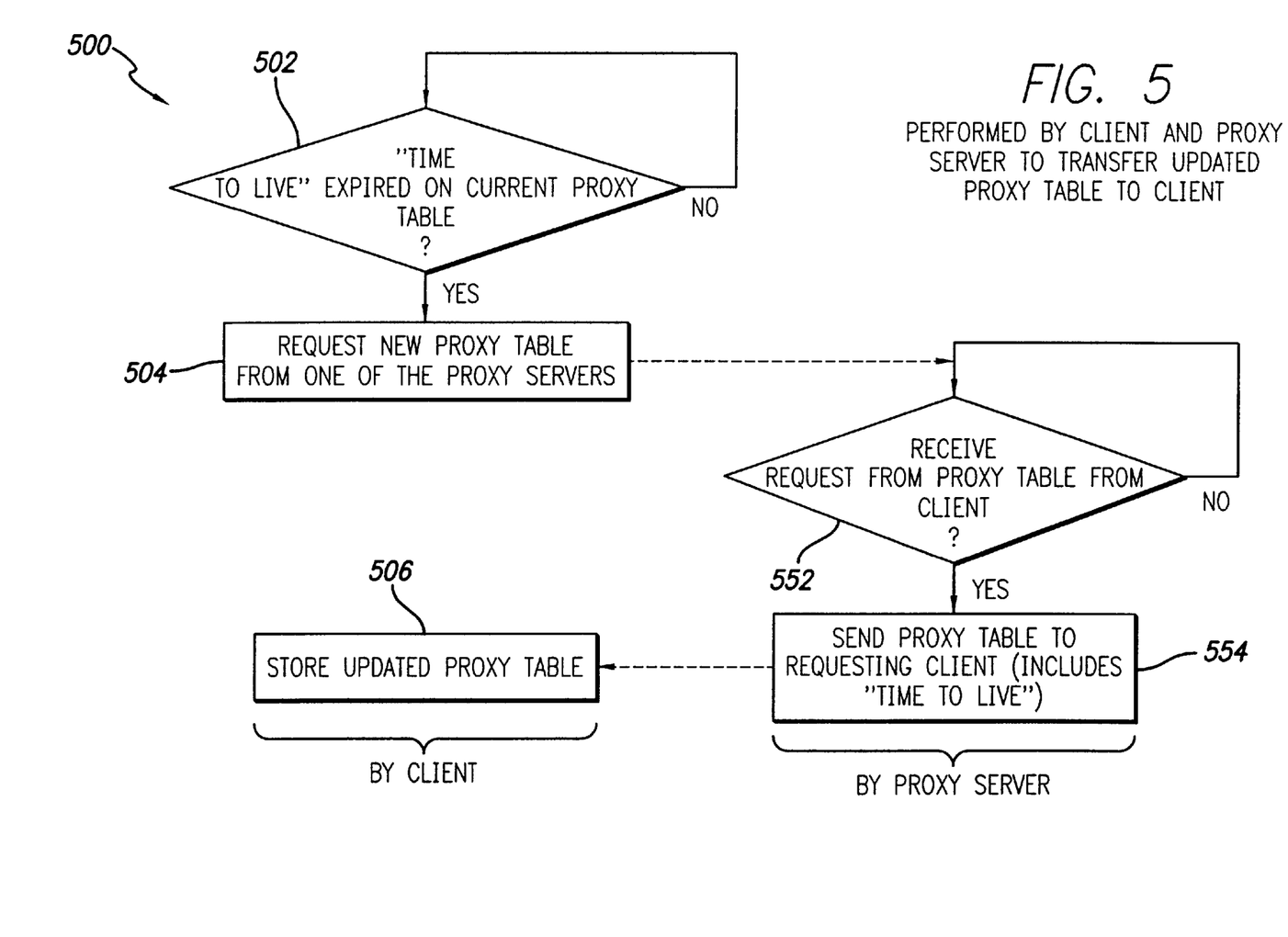
FIG. 5 is a flow chart showing steps performed by a client and a proxy server to transfer an updated proxy table between the proxy server and the client in accordance with the embodiment of FIG. 3.

FIG. 5 is a flow chart 500 showing steps performed by a client and a proxy server to transfer an updated proxy table between the proxy server and the client in accordance with the embodiment of FIG. 3. Steps performed by the client are on the left side of the diagram and steps performed by the proxy server are on the right. In step 502, the client determines whether the "time to live" for the proxy table has expired. If so, the client requests a new proxy table from the proxy server indicated in the proxy table (e.g., in field 716 of a table entry). In step 552, the proxy server receives the request and sends the most recent version of the updated proxy table in step 554. The client receives the updated proxy table in step 506 and begins using the updated proxy table as described below.

Alternately, the proxy tables can be periodically loaded into the clients from a source outside the network, such as a human user who periodically updates the proxy table in the client.

Figure 6:
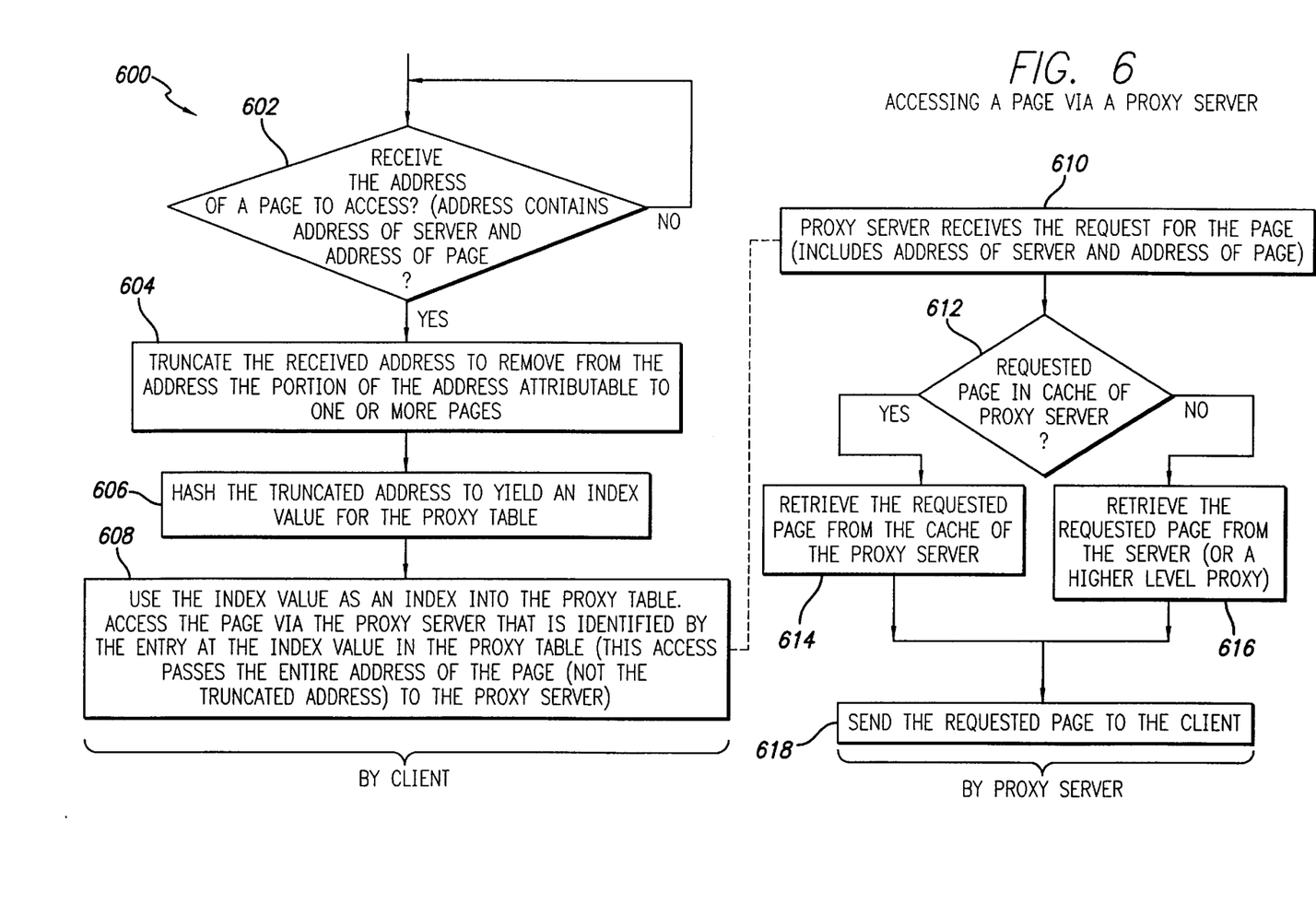
FIG. 6 is a flow chart showing steps performed by a client and a proxy server when the client accesses a resource via the proxy server in accordance with the embodiment of FIG. 3.

FIG. 6 is a flow chart 600 showing steps performed by a client and a proxy server when the client accesses a page stored on a server via the proxy server in accordance with the embodiment of FIG. 3. Steps performed by the client are on the left side of the diagram and steps performed by the proxy server are on the right. In step 602, the client receives a request for a page. This request can be generated by a human user typing in a URL, by a human user clicking on a link in a displayed page, can be created automatically by the client, or can be received or generated via any other appropriate source and method. Although the described embodiment uses a URL as an address, the present invention can be used with any appropriate type of address. The address of a page includes the address of the server storing the page (e.g., the domain on the server) and the address of the page. In the described embodiment, this address has the form of a URL for the page, such as, for example:

"http//:www.company.com/newsitems.html".

Steps 604–608 process the address of the requested page to determine which proxy server the client will use to access the page. In the described embodiment, subsequent accesses to the same page by the client will always access the same proxy server. In addition, accesses for all pages stored on a particular server will always be sent to the same proxy server (or to the same group of proxy servers) from any group of clients containing identical proxy tables.

Figure 8:
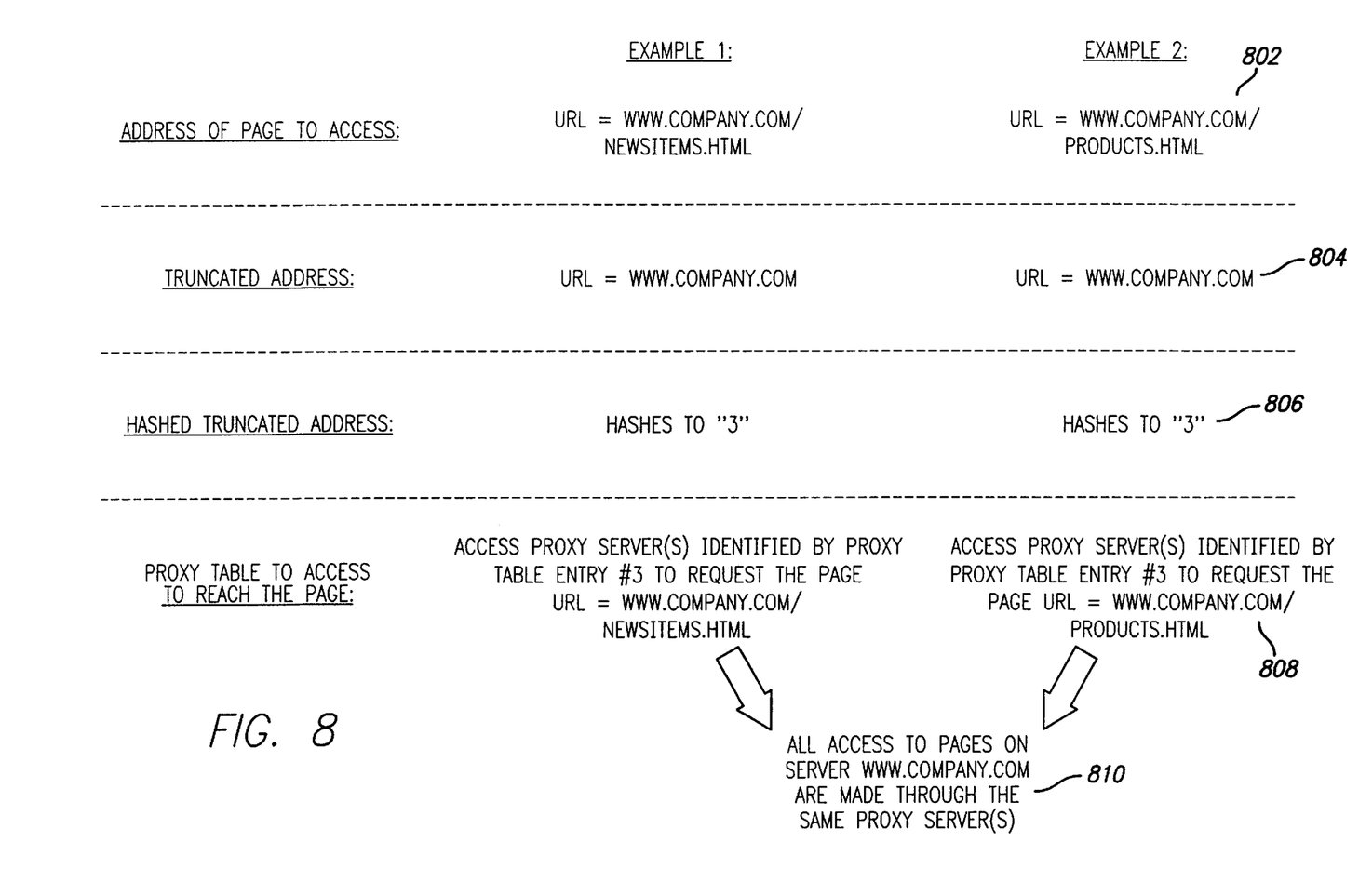
FIG. 8 provides an example of how requests for two different pages in the same domain are always routed to the same proxy server in the embodiment of FIG. 3.

FIG. 8 provides an example of how requests for two different pages on the same server are always routed to the same proxy server in the embodiment of FIG. 3. The steps 604–608 of FIG. 6 will be described below in connection with the example of FIG. 8.

Step 604 truncates the address of the requested page to remove from the address the portion of the address attributable to one or more nested pages. Thus, for example, in FIG. 8, the address:

"http//:www.company.com/newsitems.html".

is truncated to "www.company.com". Similarly, the address:

"http//:www.company.com/products.html". is truncated to "www.company.com".

Step 606 hashes the truncated address to yield an index value for the proxy table. Any appropriate hashing function can be used as long as it has the property that it distributes the server names among the entries of the proxy table in a desired distribution. In the example of FIG. 8, "www.company.com" hashes to an index value of "3".

Another example of a hash function can be the following: convert each character to the equivalent number in its ASCII representation. Add up all the numbers. Take the remainder modulus N, where N is the number of entries (or logical entries) in the proxy table.

Figure 7B:
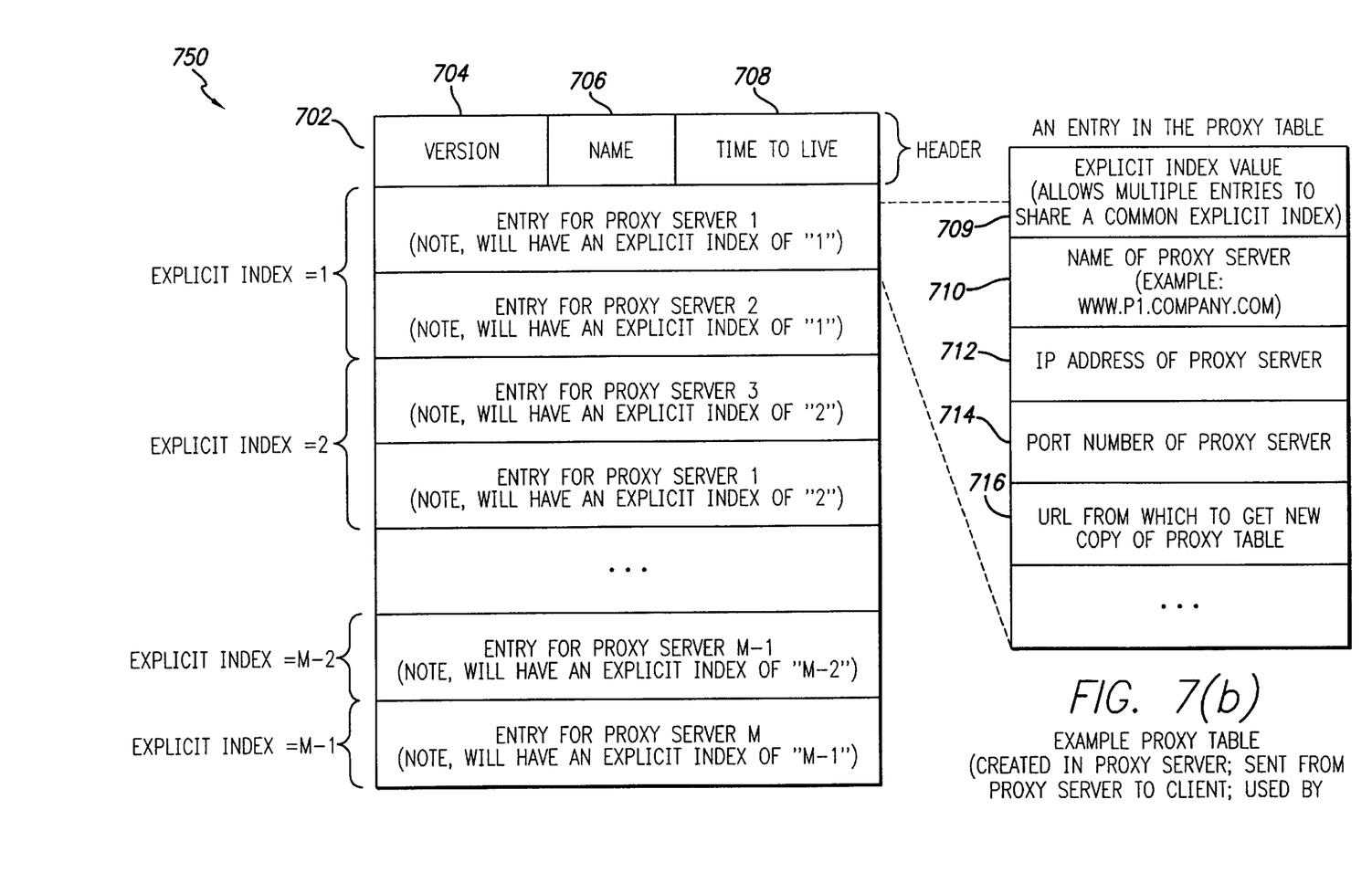
FIG. 7(b) shows an exemplary format of a proxy table with explicit indices.

A logical entry is an entry or a group of entries in the proxy table that can be indexed with the same index value. As shown in FIG. 7(*a*), some embodiments have a number of indices in each proxy table equal to the number of proxy servers M. As shown in FIG. 7(*b*), some embodiments have a number of indices in each proxy table not necessarily equal to the number of proxy servers. In the embodiment of FIG. 7(*b*), each entry has an explicit index 709 associated therewith. For example, in FIG. 7(*b*), a logical entry having an explicit index of "1" has information for two proxy servers in the logical entry (proxy server 1 and proxy server 2). Both entries in the logical entry have an explicit index of "1". Similarly, a logical entry having an explicit index of "2" has information for two proxy servers in the logical entry (proxy server 2 and proxy server 1). Both entries in the second logical entry have an explicit index of "2". In contrast, in FIG. 7(*b*), logical entries having explicit indices of "M-1", and "M" each have information for only one proxy server in the logical entry.

In the described embodiment, if a logical entry refers to more than one proxy server, then the client picks one of the proxy servers in the logical entry at random when accessing a Web page. While use of logical entries containing information for multiple proxy servers somewhat hurts the goal of making efficient use of persistent connections, it does tend to aid load balancing between proxy servers. For example, in FIG. 7(*b*), whenever the client hashes to the first logical entry in the proxy table for a particular page, it picks proxy servers 1 and 2 half of the time, respectively, thus spreading access to the page out over these two proxy servers. On the other hand, since the logical entry for explicit index "1" only points to two proxy servers, proxy server 1 and proxy server 2, only those two proxy servers may have to maintain a persistent connection to the server hosting a particular web page.

Note that in the format of FIG. 7(b), a proxy server can be in more than one logical entry in the proxy table. For example, information pointing to proxy server 1 is in both the first and second logical entries. Thus, for example, a page address hashing to "1" and a page value hashing to "2" both hash to different logical entries containing information for a same proxy server. Thus, those two pages may both be reachable via the same proxy server.

Figure 7C:
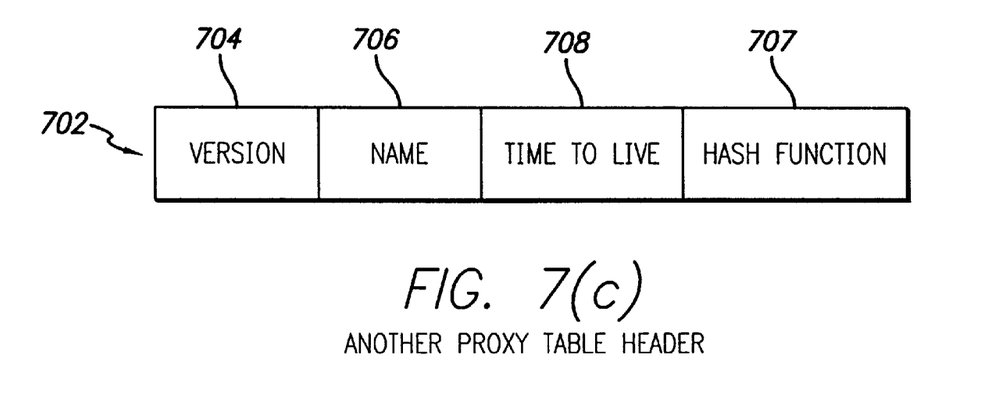
FIG. 7(c) shows another exemplary format of a header in a proxy table.

As shown in FIG. 7(c), the hash function 707 can also be stored in the proxy table (for example, in the header 702). This format allows the hash function to be changed by the proxy servers if the proxy servers determine that the clients need to use a different hash function.

Step 608 uses the index value from step 606 as an index into the proxy table. Specifically, step 608 sends a request for the page to the proxy server identified in the proxy table entry at the index value. Thus, in the example a page request is sent to the proxy server identified in entry "3" of the proxy table (for example, by fields 710–716). It is important to note that all pages stored on the same server will be requested via the same proxy server because all truncated names will hash to the same proxy table logical entry. Thus, if a persistent connection exists between the proxy server and the server for the domain, the request will be able to take advantage of the persistent connection. Use of a persistent connection if one exists helps minimize network traffic, since there is no need to open several different connections to access a Web page. Use of a persistent connection also speeds up access to pages in the domain. In certain embodiments, if no persistent connection exists, one is created and maintained to be available for later requests.

Steps 610 through 618 show steps performed by the proxy server once it receives the page request. Persons of ordinary skill in the art generally know these steps. Specifically, the proxy server receives the request for a page in step 610. This request includes the address of the server and the address of the page. For example:

"http//:www.company.com/newsitems.html" or
"http//:www.company.com/products. html".

In steps 612 through 616, the proxy server either retrieves the requested page from the proxy server's cache or retrieves the requested page from the server or a higher level proxy (if the page is not cached). Alternate embodiments can include one or more non-caching proxy servers. In step 618, the page is sent to is the requesting client.

In summary, in the described embodiment., each client periodically requests a proxy table from one of a plurality of proxy servers. The proxy servers maintain the proxy table, adding or deleting entries as proxy servers are added or deleted. A proxy server receiving a request from a client for a proxy table sends a copy of the current proxy table to the requesting client. The client thereafter uses the proxy table to determine which proxy server to access when the client needs to retrieve one of the various pages stored on the plurality of servers. Because all clients using the same proxy tables send all requests for a given domain to the same proxy server, that proxy server is able to open and maintain a persistent connection to the server or servers for the domain. This eliminates the inefficiency involved when multiple proxy servers open and maintain persistent connections.

While various embodiments of the present invention have been described those skilled in the art, both now and in the future, may make various improvements and enhancements which fall within the scope of the claims and equivalents.

What is claimed is:

1. A method of accessing information in a client/server network, comprising the steps, performed by a client in the client/server network, of:
   receiving a proxy table having at least one entry for each of a plurality of proxy servers in the client/server network, the entry containing information about how to connect to a respective one of the proxy servers;
   receiving an address of a page to access, the page being stored on a server in the client/server network;
   truncating the address to remove from the address a portion of the address attributable to the page, yielding a truncated address identifying the server for the page;
   hashing the truncated address to yield an index value of the proxy table; and
   accessing a proxy server that is pointed to by the index value in the proxy table, to retrieve the page.

2. The method of claim 1, further comprising the step, performed by the proxy server, of opening a persistent http connection between the proxy server and the server if one does not already exist.

3. The method of claim 1, further comprising the step, performed by the proxy server, of retrieving the page from a cache in the proxy server.

4. The method of claim 1, further comprising the step, performed by the proxy server, of retrieving the page via a persistent connection between the proxy server and the server.

5. The method of claim 1, wherein the step of receiving the proxy table includes the step of receiving the proxy table from a human user.

6. The method of claim 1, wherein the step of receiving the proxy table includes the step of receiving the proxy table from one of the proxy servers.

7. The method of claim 1, wherein the step of receiving an address of a page to access includes the step of receiving a URL of a page to access.

8. The method of claim 1, wherein the hashing step includes:
   converting each character in the address to its equivalent number in ASCII representation, yielding a plurality of converted numbers;
   adding the plurality of converted numbers to yield a sum; and
   taking the remainder modulus N of the sum where N is a number of logical entries in the proxy table.

9. The method of claim 1, wherein the step of accessing a proxy server includes the step of sending, by the client, an http request to the proxy server at a URL contained within the proxy table in the client in accordance with the index value.

10. The method of claim 1, wherein the proxy table identifies the hash function used in the hashing step.

11. The method of claim 1, wherein the proxy table includes explicit indices.

12. The method of claim 1, wherein multiple proxy table entries share a common index.

13. A method of accessing information in a client/server network, comprising the steps, performed by a client in the client/server network, of:
   receiving an address of a first page to access, the first page being stored on a first server in the client/server network;

receiving an address of a second page to access, the second page being stored on the first server in the client/server network;

truncating the first and second addresses of the first and second pages to remove from each address the portion of the address attributable to the page;

hashing the truncated first and second addresses to yield a first index value and a second index value of a proxy table stored in the client, the first index value and the second index value always being equal because the first and second page are stored on the same server; and accessing the same proxy server to access the first and second page on the first server, the same proxy server being identified by the first and second index values in the proxy table.

14. The method of claim 13, wherein the first page is in a first domain stored on the first server, and wherein the second page is also in the first domain stored on the first server in the client/server network.

15. An apparatus that accesses information in a client/server network, comprising:

circuitry configured to receive a proxy table having an entry, for each of a plurality of proxy servers in the client/server network, containing information about how to connect to a respective one of the proxy servers;

circuitry configured to receive an address of a page to access, the page being stored on a server in the client/server network;

circuitry configured to truncate the address to remove from the address the portion of the address attributable to the page;

circuitry configured to hash the truncated address to yield an index value of the proxy table; and circuitry configured to access a proxy server that is pointed to by the index value in the proxy table.

16. The apparatus of claim 15, wherein the circuitry configured to receive an address of a page to access includes circuitry configured to receive a URL of a page to access.

17. The apparatus of claim 15, wherein the circuitry configured to hash includes:

a portion configured to convert each character in the address to its equivalent number in ASCII representation, yielding a plurality of converted numbers;

a portion configured to add the plurality of converted numbers to yield a sum; and a portion configured to take the remainder modulus N of the sum where N is a number of logical entries in the proxy table.

18. The apparatus of claim 15, wherein the circuitry configured to access a proxy server includes the circuitry configured to send an HTTP request to the proxy server at a URL contained within the proxy table in accordance with the index value.

19. The apparatus of claim 15, further comprising, in the proxy server, circuitry configured to open a persistent http connection between the proxy server and the server if one does not already exist.

20. The apparatus of claim 15, wherein the proxy table is received from a human user.

21. The apparatus of claim 15, wherein the proxy table is received from one of the proxy servers.

22. The apparatus of claim 15, wherein the proxy table identifies a hash function used in the hashing portion.

23. The apparatus of claim 15, wherein the proxy table includes explicit indices.

24. The apparatus of claim 15, wherein multiple proxy table entries share a common index.

25. A system that accesses information in a client/server network, comprising:

circuitry configured to receive an address of a first page to access, the first page being stored on a first server in the client/server network;

circuitry configured to receive an address of a second page to access, the second page being stored on the first server in the client/server network;

circuitry configured to truncate the first and second addresses to remove from the addresses the portion of the address attributable to the pages;

circuitry configured to hash the truncating first and second addresses to yield a first index value and a second index value of a proxy table stored in the client, the first index value and the second index value always being equal; and circuitry configured to access the same proxy server for the first and second pages, the same proxy server being identified by the first and second index values in the proxy table.

26. An apparatus that accesses information in a client/server network, comprising:

means for receiving a proxy table having an entry, for each of a plurality of proxy servers in the client/server network, that contains information about how to connect to a respective one of the proxy servers;

means for receiving an address of a page to access, the page being stored on a server in the client/server network;

means for truncating the address to remove from the address a portion of the address attributable to the page, yielding a truncated address identifying the server for the page;

means for hashing the truncated address to yield an index value of the proxy table; and means for accessing a proxy server that is pointed to by the index value in the proxy table, to retrieve the page.

27. An apparatus that accesses information in a client/server network, comprising:

means for receiving an address of a first page to access, the first page being stored on a first server in the client/server network;

means for receiving an address of a second page to access, the second page being stored on the first server in the client/server network;

means for truncating the first and second addresses of the first and second pages to remove from each address the portion of the address attributable to the page;

means for hashing the truncated first and second addresses to yield a first index value and a second index value of a proxy table stored in the client, the first index value and the second index value always being equal because the first and second page are stored on the same server; and means for accessing the same proxy server to access the first and second page on the first server, the same proxy server being identified by the first and second index values in the proxy table.

28. A computer program product comprising:

a computer readable medium having computer readable code embodied therein to access information in a client/server network, the computer program product including:

computer program code devices configured to cause a computer to effect receiving a proxy table having an entry, for each of a plurality of proxy servers in the client/server network, containing information about how to connect to a respective one of the proxy servers;

computer program code devices configured to cause a computer to effect receiving an address of a page to access, the page being stored on a server in the client/server network;

computer program code devices configured to cause a computer to effect truncating the address to remove from the address the portion of the address attributable to the page;

computer program code devices configured to cause a computer to effect hashing the truncated address to yield an index value of the proxy table; and computer program code devices configured to cause a computer to effect accessing a proxy server that is pointed to by the index value in the proxy table.

29. A computer data signal embodied in a carrier wave and representing sequences of instructions which, when executed by the processor, causes said processor to access information in a client/server network, by performing the steps of:

executing a first computer program for receiving a proxy table having an entry, for each of a plurality of proxy servers in the client/server network, containing information about how to connect to a respective one of the proxy servers;

executing the first computer program for receiving an address of a page to access, the page being stored on a server in the client/server network;

executing the first computer program for truncating the address to remove from the address the portion of the address attributable to the page;

executing the first computer program for hashing the truncated address to yield an index value of the proxy table; and executing the first computer program for accessing a proxy server that is pointed to by the index value in the proxy table.

* * * * *